(12) United States Patent
Chinnapatlolla et al.

(10) Patent No.: US 12,299,470 B2
(45) Date of Patent: May 13, 2025

(54) REDUCING DOWNTIME CAUSED BY INCOMPATIBILITY ISSUES FROM UPGRADING FIRMWARE AND SOFTWARE

(71) Applicant: International Business Machines Corporation, Armonk, NY (US)

(72) Inventors: Anjil Reddy Chinnapatlolla, Bangalore (IN); Hariganesh Muralidharan, Bangalore (IN); Satish K. Rao, Austin, TX (US); John John Goodson, Austin, TX (US); Anil Kalavakolanu, Austin, TX (US); Peter J. Heyrman, Rochester, MN (US); Vani D. Ramagiri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 17/655,839

(22) Filed: Mar. 22, 2022

(65) Prior Publication Data

US 2023/0305871 A1 Sep. 28, 2023

(51) Int. Cl.
*G06F 9/455* (2018.01)
*G06F 8/65* (2018.01)
(52) U.S. Cl.
CPC ............ *G06F 9/45558* (2013.01); *G06F 8/65* (2013.01)
(58) Field of Classification Search
None
See application file for complete search history.

(56) References Cited

U.S. PATENT DOCUMENTS 8,032,618 B2 * 10/2011 Criddle ............... G06F 9/45504
709/221
8,151,257 B2 4/2012 Zachmann
(Continued)

FOREIGN PATENT DOCUMENTS

CN 102830988 A 12/2012
WO 202172742 A1 4/2021

OTHER PUBLICATIONS

Disclosed Anonymously, "Intelligent Maintenance Scheduler Based on Contextual Analysis", An IP.com Prior Art Database Technical Disclosure, IP.com No. IPCOM000266230D, IP.com Electronic Publication Date: Jun. 24, 2021, 11 pages.

(Continued)

*Primary Examiner* — Van H Nguyen
(74) *Attorney, Agent, or Firm* — Stephen R. Yoder; Nicholas A. Welling

(57) ABSTRACT

A method and system for estimating upgrade time and mitigating errors when updating a virtualized computing system. Operations of this method include, but are not necessarily limited to the following (and not necessarily in the following order): (i) identify updates needed by a system; (ii) compare the system to be updated to other systems to determine similar systems that already had the similar updates; (iii) project the time to complete the update based on the performance characteristics of the system to be updated, the performance characteristics of the similar systems that have already been updated, and the time taken to update the similar systems; (iv) identify errors that occurred when updating the similar systems and the corresponding error resolutions; and (v) pre-emptively apply configuration changes or other error resolutions to the system to be updated.

20 Claims, 8 Drawing Sheets

(56) References Cited

U.S. PATENT DOCUMENTS

| | | | | |
|---|---|---|---|---|
| 8,813,076 B2* | 8/2014 | Anderson | ............... | G06F 8/65 |
| | | | | 718/1 |
| 8,819,657 B1* | 8/2014 | Bezbaruah | ............... | G06F 8/65 |
| | | | | 717/168 |
| 8,898,676 B2* | 11/2014 | Hiltgen | ............... | G06F 8/65 |
| | | | | 717/121 |
| 9,134,992 B2* | 9/2015 | Wong | ............... | G06F 8/65 |
| 9,146,839 B2 | 9/2015 | Chen | | |
| 9,411,621 B2* | 8/2016 | Jeswani | ............... | G06F 8/65 |
| 9,459,856 B2* | 10/2016 | Curzi | ............... | G06F 8/65 |
| 9,507,586 B2* | 11/2016 | Kamble | ............... | G06F 9/45558 |
| 9,886,262 B2 | 2/2018 | Thomas | | |
| 10,318,275 B2* | 6/2019 | Kim | ............... | G06F 9/45558 |
| 2010/0333068 A1 | 12/2010 | Niimura | | |
| 2012/0317404 A1 | 12/2012 | Chou | | |
| 2014/0157264 A1 | 6/2014 | Russinovich | | |
| 2020/0327046 A1 | 10/2020 | Rizvi | | |
| 2021/0004000 A1 | 1/2021 | Kalaskar | | |
| 2021/0034350 A1 | 2/2021 | Chen | | |

OTHER PUBLICATIONS

Disclosed Anonymously, "System and Method to Intelligently Install Patches Around Time Constraints", An IP.com Prior Art Database Technical Disclosure, IP.com No. IPCOM000236754D, IP.com Electronic Publication Date: May 14, 2014, 2 pages.

International Searching Authority, "Notification of Transmittal of the International Search Report and the Written Opinion of the International Searching Authority, or the Declaration", File Reference IEE230018PCT, International application No. PCT/CN2023/074749, International Filing Date Feb. 7, 2023, Mailed on Apr. 21, 2023, 7 pages.

* cited by examiner

REDUCING DOWNTIME CAUSED BY INCOMPATIBILITY ISSUES FROM UPGRADING FIRMWARE AND SOFTWARE

BACKGROUND

The present invention relates generally to the field of virtualized computing systems, and more specifically to maintaining and operating virtualized computing systems in order to properly carry out enterprise solutions.

The Wikipedia entry for "Hypervisor" (as of Feb. 13, 2022) states as follows: "A hypervisor (or virtual machine monitor, VMM, virtualizer) is similar to an emulator; it is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources. . . . This contrasts with operating-system-level virtualization, where all instances (usually called containers) must share a single kernel, though the guest operating systems can differ in user space . . . with the same kernel."

SUMMARY

According to an aspect of the present invention, there is a method, computer program product and/or system that performs the following operations (not necessarily in the following order): (i) identify a first plurality of updates that a first virtualized computing system needs; (ii) compare the first virtualized computing system with a set of benchmark virtualized computing systems to determine a set of similar virtualized computing systems that have made updates comparable to the first plurality of updates needed by the first virtualized computing system; (iii) responsive to the comparison, determine an estimated time to complete the first plurality of updates based, at least in part, upon a set of performance characteristics of the first virtualized computing system; (iv) identify a first plurality of errors that occurred during an update of the set of similar virtualized computing systems; and (v) responsive to the identification of the first plurality of errors, pre-emptively apply configuration changes to the first virtualized computing system.

DETAILED DESCRIPTION

Figure 1:
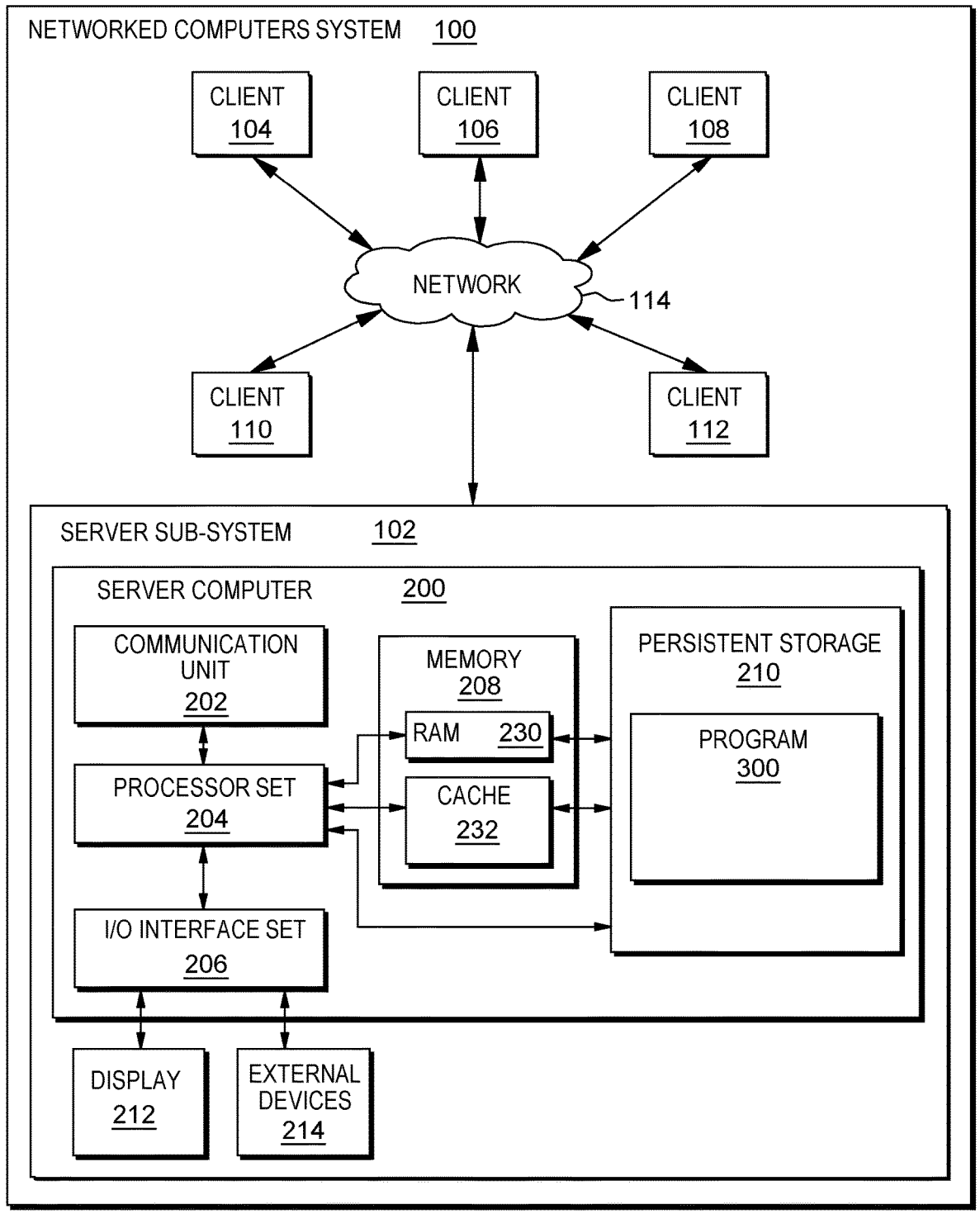
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
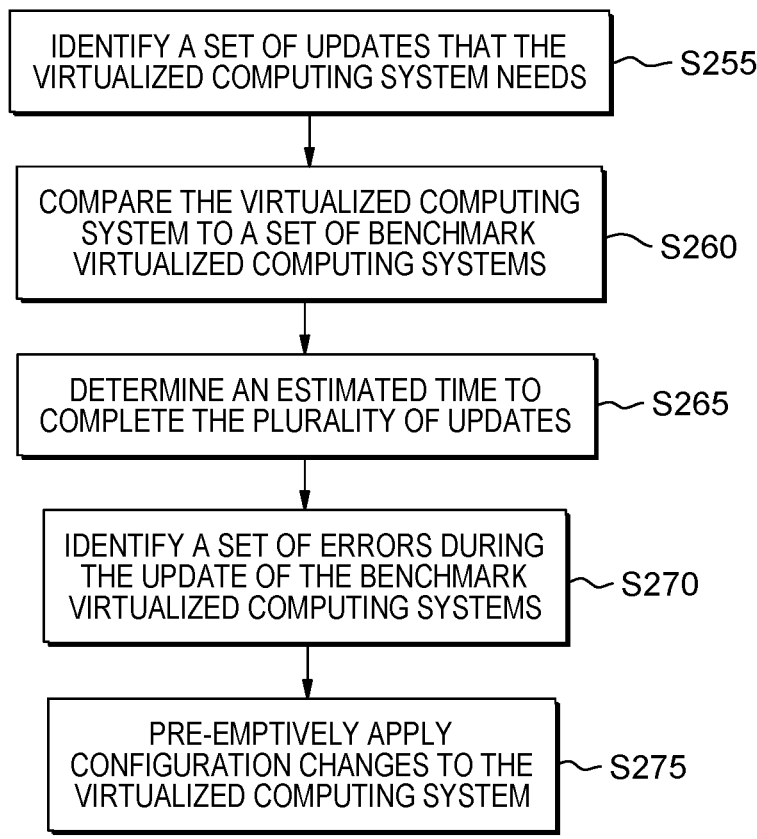
FIG. 2 is a flowchart showing a first embodiment method performed, at least in part, by the first embodiment system.
Figure 3:
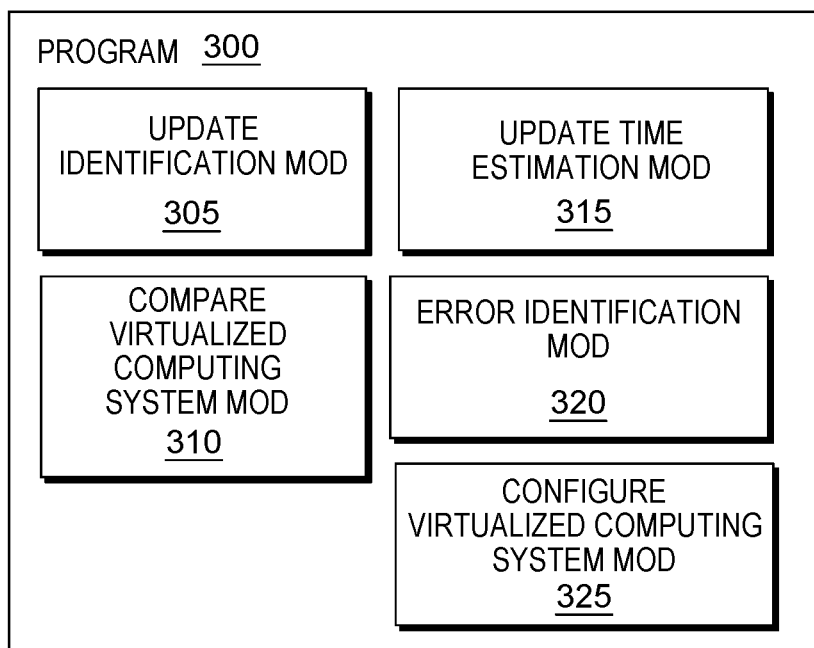
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where update identification module ("mod") 305 identifies a set of updates that a virtualized computing system needs.

Processing proceeds to operation S260, where compare virtualized computing system mod 310 compares the virtualized computing system (discussed in connection with operation S255, above) to a set of previously-utilized and/or previously-identified virtualized computing systems (sometimes herein referred to as a set of benchmark virtualized computing systems). In some embodiments of the present invention, this comparison is made in order to determine a set of virtualized computing systems that have made updates similar to the updates that are identified as being needed to be made by the virtualized computing system (discussed in connection with operation S255, above).

Processing proceeds to operation S265, where update time estimation mod 315 determines an estimated amount of time to complete the identified updates. In some embodiments of the present invention, update time estimation mod 315 records the first estimated amount of time so that it can be used as a baseline time for future updates. For example, if a second virtualized computing system requires future updates that are similar in nature to the original updates made to the first virtualized computing system, this baseline amount of time can be used to determine whether the updates made to the second virtualized computing system were made in an efficient manner.

Processing proceeds to operation S270, where error identification mod 320 identifies a set of errors that occurred during the update process for the set of benchmark virtualized computing systems. In some embodiments of the present invention, when the number of errors that occurred during the update process is recorded, identification mod 320 is additionally used to determine whether the number of errors falls below an error threshold or exceeds an error threshold. In some embodiments, the error threshold is used to determine the accuracy of the update process. That is, if more errors are identified, then future updates that have an error count greater than the original error count may be considered to be less accurate than future updates that have an error count that is fewer than the original error count.

Processing finally proceeds to operation S275, where configure virtualized computing system mod 325 pre-emptively applies configuration changes to the virtualized computing system (discussed in connection with operations S255 and S260, above).

III. FURTHER COMMENTS AND/OR EMBODIMENTS

Embodiments of the present invention generally relate to updating system firmware and operating systems in a virtualized environment in a data center. The Servers/Systems are virtualized using a Hypervisor and aided by a special kind of virtual machine referred to as a Virtual IO Server (VIOS). The Hypervisor is computer software or firmware that allows the creation of multiple virtual machines (VMs) that run a given operating system and allows the sharing of resources allocated to the Server among the VMs. In the virtualization setups, the sharing (or virtualization) of I/O resources are delegated to a VIOS. This VIOS operates like any other VM running on the Server, but plays the role of the hosting VM and takes the responsibility of sharing the physical I/O resources, namely Storage and Network adapters, among other client VMs on the system. This is achieved by the VIOS owning the I/O resources and connecting them to a virtual (or a Software equivalent) I/O resource. The Virtual I/O resources are then used by the virtual machines to perform I/O operations. With the above context, we would be using this terminology below to further explain embodiments of the present invention.

When a firmware update, VIOS update, or an OS update is performed in a virtualized environment like the one described above, there is always a possibility that the newer updates or levels or features are not compatible with the existing configuration of the virtualized environment. In such scenarios, post update there might be incompatibilities across the stack and might require a downtime to change settings and to make the configuration changes. Additionally, the time taken for the updates varies according to: (i) the number of subsystems in the stack that needs updating; (ii) calculating the total time taken for all these updates; and (iii) planning the maintenance window for the exact total time required or longer becomes a problem.

With the addition of VIOS, the complexity of the compatibility across the stack is further complicated and any changes to the VIOS might cause incompatibilities and could affect the workloads running on the Operating Systems in such virtualized environments. Embodiments of the present invention provide a mechanism to perform a stack compatibility check prior to the actual update and ensure that the configuration of the virtualized environment remains compatible after the update as well.

Embodiments of the present invention provide an algorithm to parse the README files as well as certain specific command outputs associated with corresponding components or subsystems and check for pre-requisites. This algorithm also checks for compatibilities between different levels of these subsystems. While the management console might be able to perform this check for firmware update, if initiated via management console, OS updates, and VIOS updates would need an additional mechanism for the OS/VIOS to talk to the management console via the Hypervisor to perform a validation operation before proceeding with the updates or upgrades.

The README/command outputs based compatibility stack should be considered as a baseline level but would be improved by having specific known configurations. These systems can currently upload existing configurations as part of a call home update. These updates are configured to report the current configuration at regular intervals, and in some embodiments, these updates are done on a weekly basis.

The solution includes documenting the number of systems reporting a specific configuration. Additionally, when systems have issues, the configuration of the system reporting an issue should be documented and stored. When systems with certain configurations have issues that should be noted as a negative value for that configuration when computing the best configurations to recommend. Information on time taken for updates or upgrades need to be sent via call home data, which will be used to improve the baseline data for time taken for updates/upgrades for each subsystem. This baseline data will further be used to improve the accuracy of the update time calculations.

In some embodiments, the management console will fetch the necessary information of the existing configuration and also the newer version and perform the appropriate validations. These validations and results will be put into a learning model and also data will be collected after an update on any failures to be fed back into the model so that the validation can be improved continuously. When suggesting a configuration, the management console should base the choice of configuration on the number of systems reporting a specific configuration that also matches the extracted valid configurations.

In some embodiments, data collected as part of call home or telemetry will be enhanced to send information on configuration levels, issues seen in the environment, SRCs that indicate problems, time taken for updates and/or upgrades, etc.

The components involved can be broadly classified into the below categories:

(1) Management Console:

For Management console updates, apart from checking pre-requisites for management console levels, firmware, VIOS, the OS and any management console in HA configuration or a pool model would also be checked.

(2) Firmware/Hypervisor:

The management console performs the check for compatibility of the configuration with the newer level.

(3) Virtual IO Server:

When the VIOS update is initiated, the VIOS will initiate a communication to the management console via the hypervisor to check for compatibility.

(4) Operating Systems:

When an OS update or upgrade is initiated, the OS will check with the management console for compatibility through the hypervisor. In some embodiments, the management console will check the configuration of the system and different subsystems in the stack and use the readme/command outputs information along with the learning that has been achieved from the call home information to determine the best configuration before the updates are performed.

Embodiments of the present invention provide a method of estimating upgrade time and mitigating errors when updating a computing system. Operations of this method include, but are not necessarily limited to the following (and not necessarily in the following order): (i) identify updates needed by a system; (ii) compare the system to be updated to other systems to determine similar systems that already had the similar updates; (iii) project the time to complete the update based on the performance characteristics of the system to be updated, the performance characteristics of the similar systems that have already been updated, and the time taken to update the similar systems; (iv) identify errors that occurred when updating the similar systems and the corresponding error resolutions; and (v) pre-emptively apply configuration changes or other error resolutions to the system to be updated.

Embodiments of the present invention provide a cognitive upgrade process that estimates adjusting the upgrade time and upgrade risk. In some embodiments, the upgrade process includes N number of updates where each update can take a certain amount of time, and is associated with a certain amount of failure risk that causes meaningful disruption and downtime.

In order to make a proper estimate, embodiments of the present invention leverage an ensemble of algorithms that utilize machine learning and artificial intelligence (AI) techniques.

Key elements of this algorithm include the following operations (not necessarily in the following order):

(1) determine the complete set of software and firmware packages involved in the stack that are candidates for upgrade;

(2) for the stack being upgraded, determine the "gaps" between current state and the desired state considering the complete set;

(3) Identify peer groups for each of the gaps where the peer group has characteristics that are similar to the stack of interest "except" for the gap being filled. Nearest neighbor algorithms will be used to identify the peer group for each step. Similarity is based on the complete set of packages.

For example, if the "gap" being addressed is upgrade of TCP component from Version 1 to Version 2, the peer group is made up of all other known stacks where rest of the SW and FW packages are the same or very close to the stack being upgraded except that TCP component has already been upgraded to Version 2.

(4) Gather time taken to upgrade TCP to Version 2 for the peer group;

(5) Gather factors that determine performance characteristics such as compute performance, storage read/write performance which will be used as input features for machine learning algorithms;

(6) Employ supervised machine learning approaches to build an ensemble of ML algorithms to forecast the time that the upgrade of TCP from version1 to version2 is expected to take along with an interval (e.g. It will take 30 minutes+/−2 minutes). Features used in supervised learning are made up performance characteristics of each stack in the peer group as well the upgrade time for each stack for each gap;

(7) Repeat the above step for each of the gaps and generate upgrade time forecasts for each of the steps;

(8) Use a similar approach but consider all of the gaps at once and forecast the total time. In this case the peer groups would have gone through the total stack upgrade successfully;

(9) create an aggregate forecast based on the individual gaps; and

(10) Utilize the ensemble of ML algorithms to forecast upgrade time for each step as well the time for the entire upgrade process.

Some embodiments of the present invention determine the probability of success of for each step with respect to estimating the upgrade time and upgrade risk (as discussed above).

Using an approach similar to the algorithm described above, some embodiments of the present invention determine the probability of success for estimating the upgrade time and upgrade risk as well steps that could improve this probability. In order to do so, some embodiments utilize historical data that is available for a peer group in the form of system logs and customer support ticket information that is made available to the relevant proprietary entity. In some embodiments, text mining approaches are used to determine failure causes and recommend mitigation measures. In addition, some embodiments of the present invention utilize a collaborative filtering algorithm to predict the probability of success.

The overall upgrade process includes the following operations (not necessarily in the following order): (i) provide a summary of what to expect including a total estimated time and possible recommendations to improve time (e.g. purchase more compute resources temporarily via capacity on demand (COD)), risk assessment and risk reduction recommendations, and a detailed breakdown for each step including upgrade time and risks; (ii) proceed through each operation based on user confirmation; and (iii) adjust the upgrade time forecasts for each operation and the overall process after each operation is completed.

In order to reduce downtime, some embodiments of the present invention use a cognitive upgrade assistant. The cognitive upgrade assistant includes: (i) a chatbot that guides an administrator through the upgrade process; and (ii) inputs to the chatbot. The inputs to the chatbot include: (a) README files that are created using templates for entering dependencies; (b) a command line output (for chatbots that are run on the server); (c) historical service data for the stack; and (d) service data for other clients that have a similar configuration and have already performed an upgrade.

In some embodiments of the present invention, the cognitive upgrade process includes using the cognitive upgrade assistant to perform the following operations (not necessarily in the following order): (i) collect necessary contextual data that is stored locally on the stack; (ii) contextually integrate relevant external information from the "peer group" and for the stack; (iii) display any missing prerequisites and risks; (iv) display estimated time along with the confidence level; and (v) guide the administrator through the upgrade process using information that is already gathered and through interactions with the administrator where each step gets confirmed. In some embodiments, the administrator is a user who is prompted for confirmation by displaying what the cognitive upgrade assistant is doing and the relevant supporting evidence for the action the upgrade assistant is taking.

Figure 4:
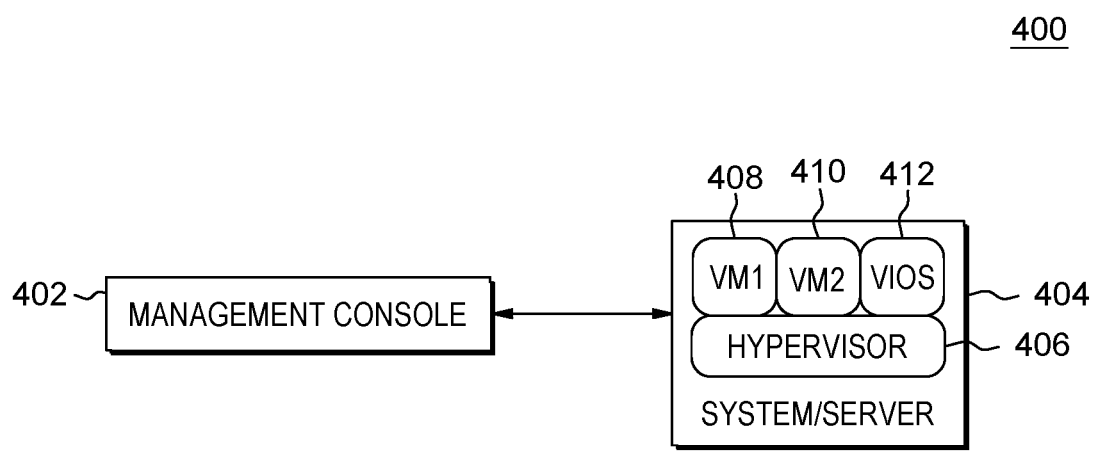
FIG. 4 is a block diagram of a first embodiment of a system according to the present invention.

Virtualized Environment diagram 400 of FIG. 4 provides a graphical representation of a virtualized environment that is used by embodiments of the present invention. Diagram 400 includes the following components: management console 402, system/server 404, hypervisor 406, virtual machine 1 (VM1) 408, virtual machine 2 (VM2) 410, and VIOS 412.

Figure 5:
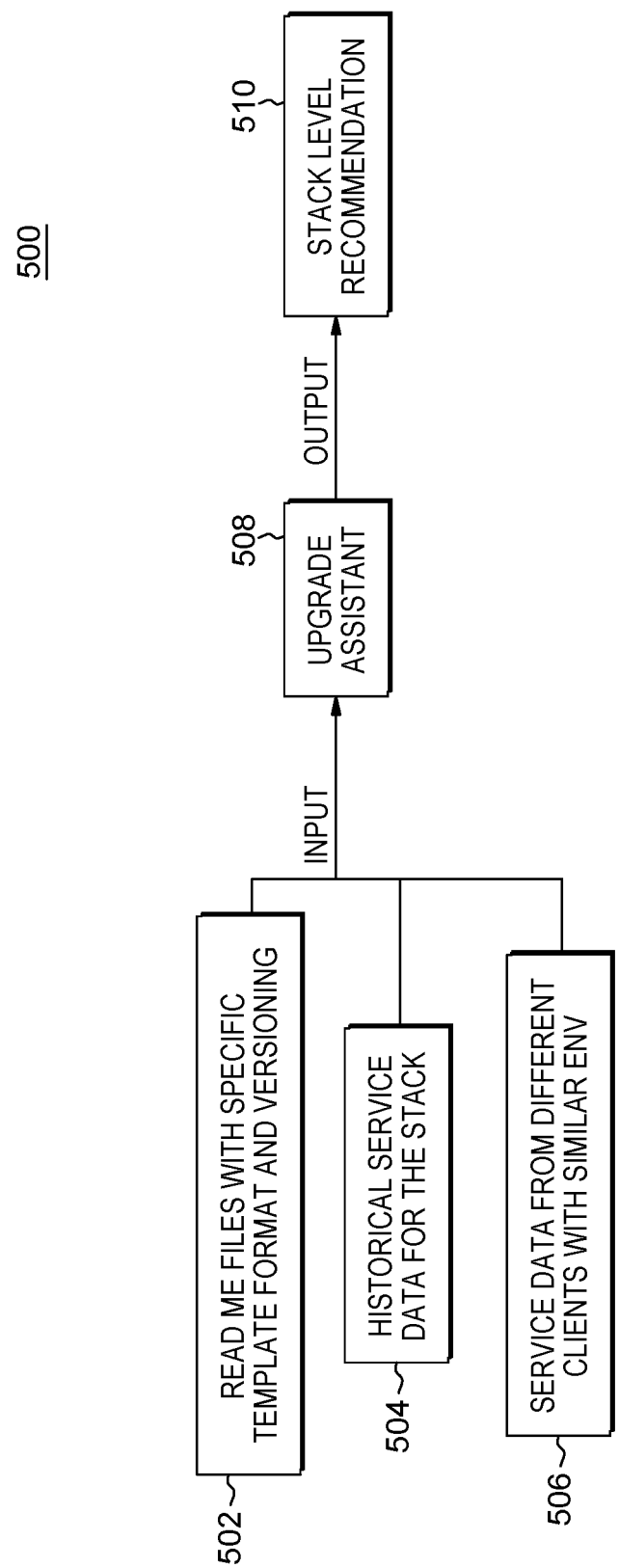
FIG. 5 is a flow diagram showing a first embodiment of a method according to the present invention.

Flow diagram 500 of FIG. 5 shows a first graphical representation of an upgrade model for stack level recommendations. Diagram 500 includes inputs such as: readme files with specific template format and versioning (502), historical service data for the given stack (504), and service data from different clients with a similar virtualized environment (506). These inputs are fed into upgrade assistant module 508, which then outputs the stack level recommendation 510.

Figure 6:
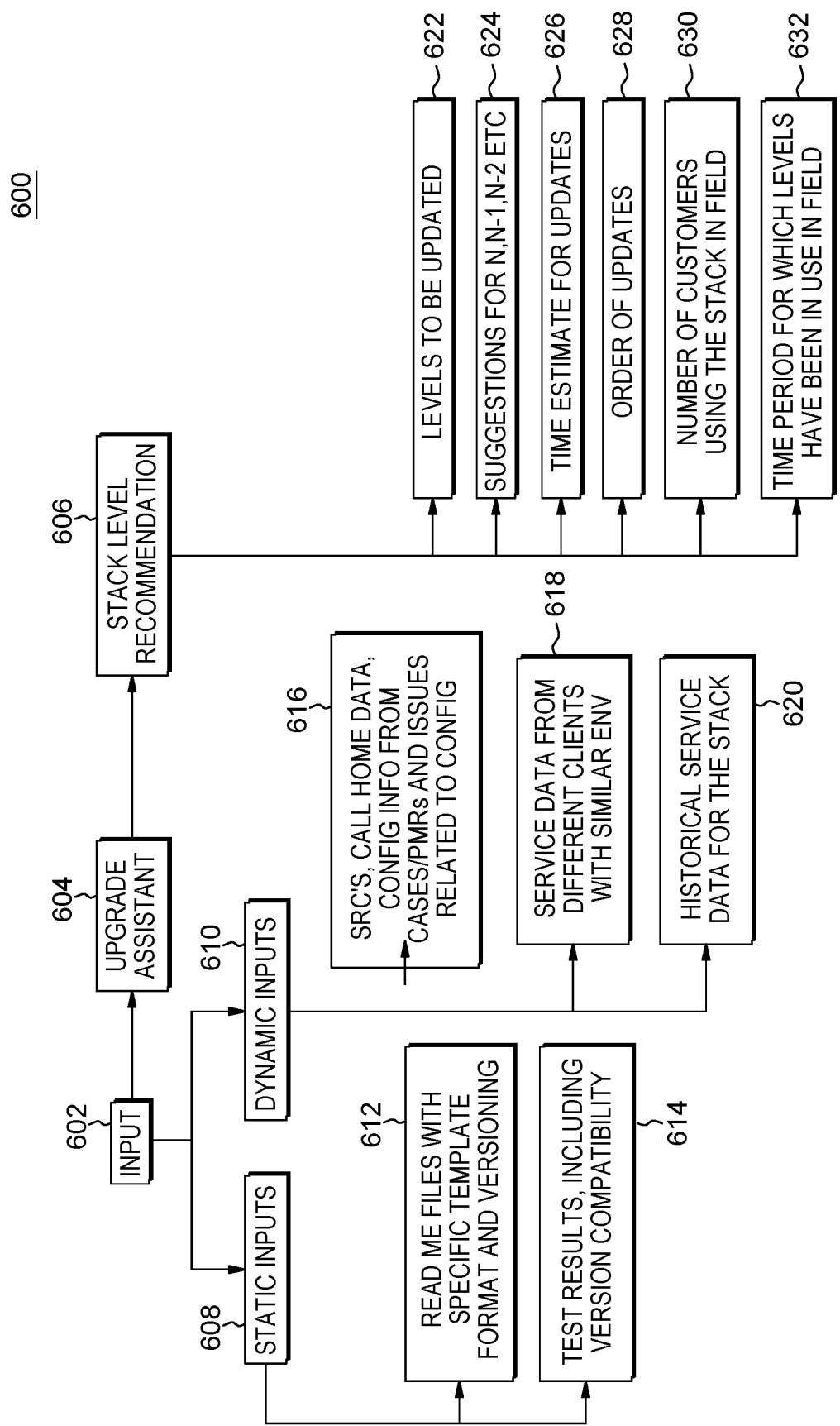
FIG. 6 is a flow diagram showing a second embodiment of a method according to the present invention.

Flow diagram 600 of FIG. 6 provides a graphical representation of an upgrade assistant model for stack level recommendations. Diagram 600 includes input 602, upgrade assistant 604, and stack level recommendation 608. With respect to input 602, there are two types of inputs: static inputs 608 and dynamic inputs 610. The static inputs (608) include readme files with specific template format and versioning (612) and test results which include information indicating version compatibility (614). The dynamic inputs (610) include: SRCs, call home data, configuration information from cases and issues relating to the configuration (616), service data from different clients with a similar virtualized environment (618), and historical service data for the stack (620). The stack level recommendations (606) include levels (or layers) to be updated (622), suggestions for N, N−1, N−2, etc. (624), time estimate for updates (626), order of updates (628), number of customers using the stack in the field (630), and the time period for which the levels (or layers) have been in use in the environment.

Figure 7:
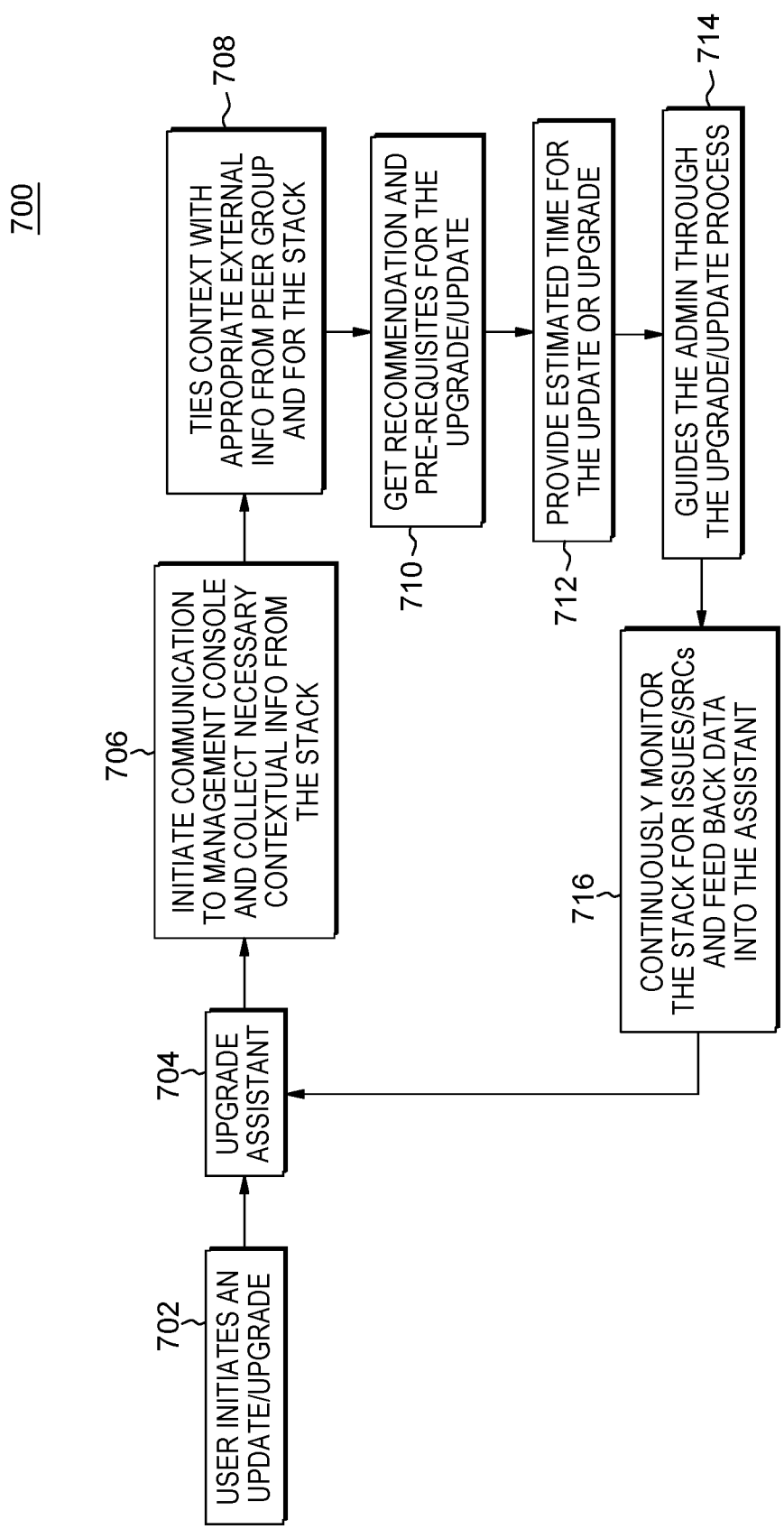
FIG. 7 is a flow diagram showing a third embodiment of a method according to the present invention.

Flow diagram 700 of FIG. 7 provides a graphical representation of an upgrade and/or update process. This process includes the user initiating and update or an upgrade (702), which is sent to the upgrade assistant (704). The upgrade assistant the initiates a communication request to the management console and collects the necessary contextual information from the stack (706). This contextual information is then tied with the relevant external information from a peer group that is designed for use with the stack (708). Through this contextual information, a recommendation and prerequisites for the upgrade/update is obtained (710). Next, an estimated time for the update or upgrade is provided (712). This estimated time for the update/upgrade guides the administrator through the update/upgrade process (714). Finally, the stack is continuously monitored for issues/SRCs and sends this data back to the upgrade assistant (716).

Figure 8:
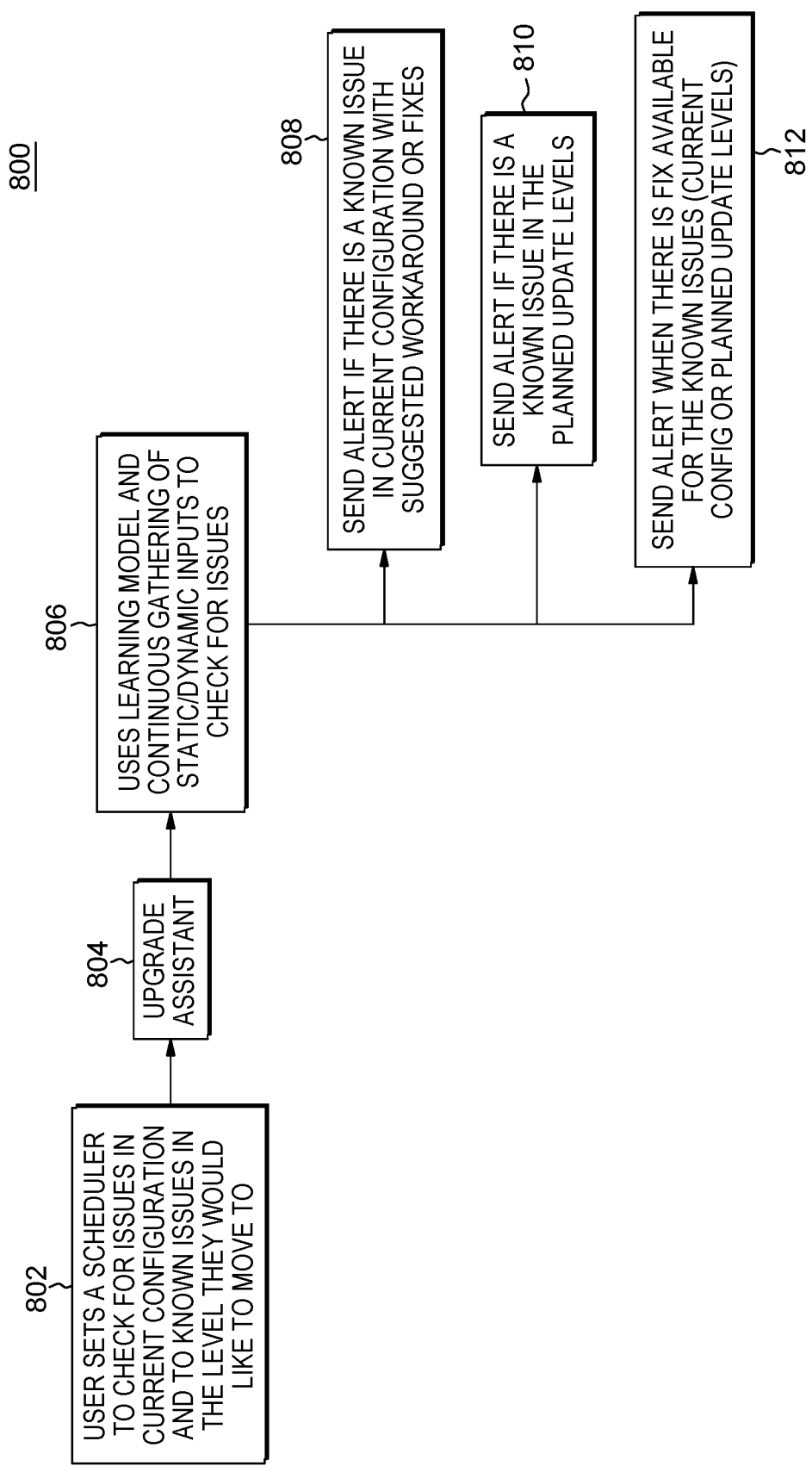
FIG. 8 is a flow diagram showing a fourth embodiment of a method according to the present invention.

Flow diagram 800 of FIG. 8 provides a graphical representation for alerts and notifications for the update/upgrade process. The user sets a scheduler to check for issues in a current configuration and for known issues in the level (or layer) that the user would like to move to (802). The information received from the scheduler is sent to the upgrade assistant (804). The upgrade assistant uses a machine learning model to continuously gather the static the dynamic inputs (similar or same to the static and dynamic inputs discussed in connection with FIG. 6, above) (806).

In some embodiments, an alert scheduling module sends an alert: (i) if there is a known issue in the current configuration along with information for how to fix or otherwise workaround the known issue (808); (ii) if there is a known issue in the planned update levels (810); and/or (iii) when there is a fix available for the known issue (whether that is in the current configuration or in the planned update levels) (812).

Figure 9:
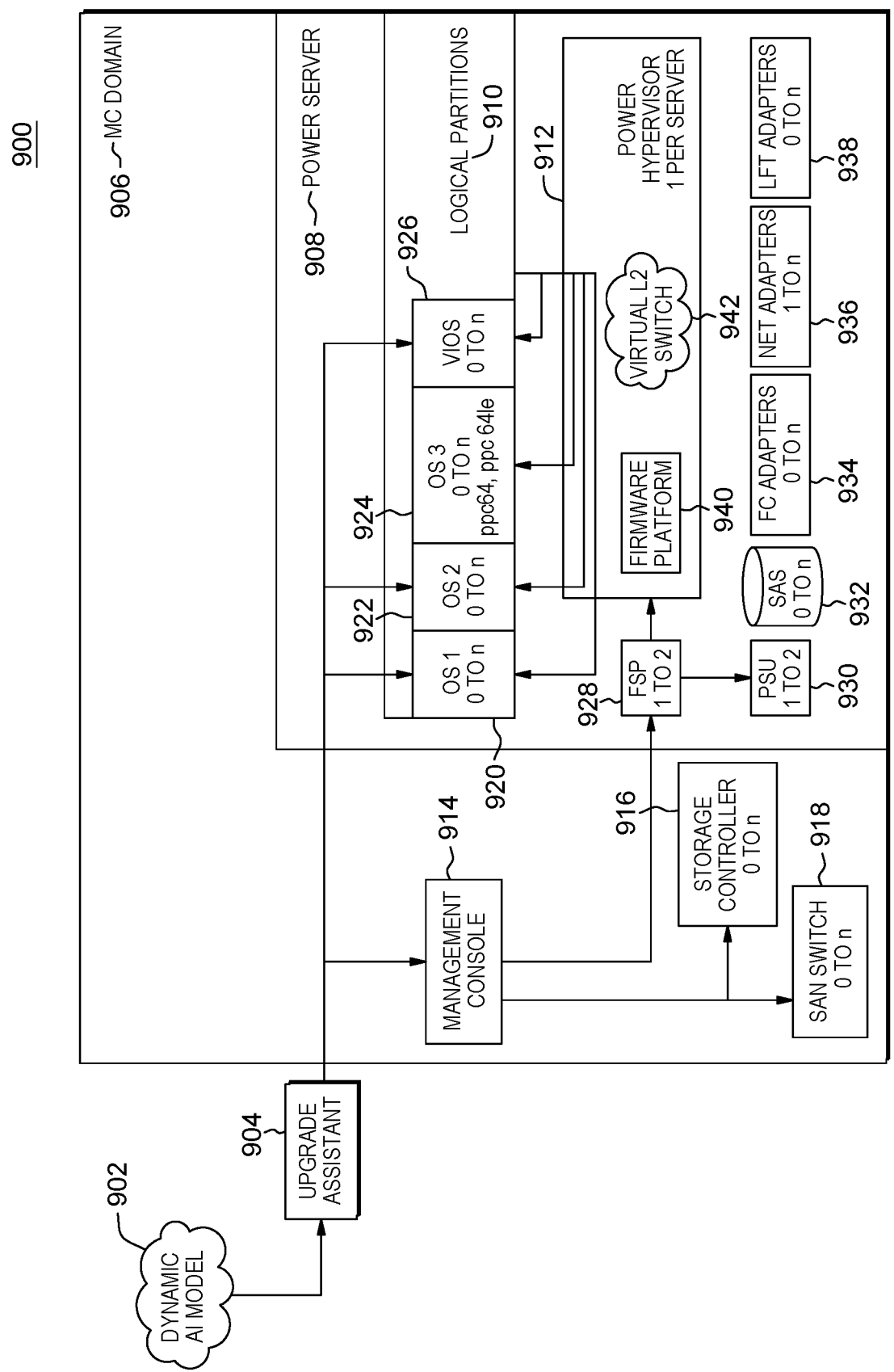
FIG. 9 is a block diagram showing a second embodiment of a system according to the present invention.

Block diagram 900 of FIG. 9 provides a graphical representation of a power virtualization and management model. Block diagram 900 includes: dynamic AI model 902, upgrade assistant 904, MC domain 906, power server 908, logical partitions 910, power hypervisor 912, management console 914, storage controller 916, SAN switch 918, OS 1 (operating system 1) 920, OS 2 (operating system 2) 922, OS 3 (operating system 3) 924, VIOS 926, FSP 928, PSU 930, SAS 932, FC Adapters 934, NET adapters 936, LFT adapters 938, firmware platform 940, and virtual L2 switch 942. In some embodiments of the present invention, operating systems that are utilized can include proprietary operating systems (such OS 1 920, OS 2 922, and/or OS 3 924).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for updating a virtualized computing environment, the CIM comprising:
   identifying a first plurality of updates that a first virtualized computing system requires, wherein the first virtualized computing system is a virtual IO server;
   comparing the first virtualized computing system with a set of benchmark virtualized computing systems to determine a set of similar virtualized computing systems that have made updates comparable to the first plurality of updates required by the first virtualized computing system;
   determining whether the update passes a stack compatibility check, based on comparing the first virtualized computing system with a set of benchmark virtualized computing systems;
   responsive to a determination the update passes a stack compatibility check, determining an estimated time to complete the first plurality of updates based, at least in part, upon a set of performance characteristics of the first virtualized computing system;
   identifying a first plurality of errors that occurred during an update of the set of similar virtualized computing systems; and
   responsive to identifying the first plurality of errors, pre-emptively applying configuration changes to the first virtualized computing system.

2. The CIM of claim 1 further comprising:
   responsive to identifying the first plurality of errors that occurred during the update of the set of similar virtualized computing systems, determining that the first plurality of errors has not exceeded a first error threshold.

3. The CIM of claim 1 wherein the set of performance characteristics of the first virtualized computing system comprises information indicative of a compute performance of the first virtualized computing system.

4. The CIM of claim 1 wherein the set of performance characteristics of the first virtualized computing system comprises information indicative of a storage read and/or write performance data of the first virtualized computing system.

5. The CIM of claim 1 further comprising:
   determining a first amount of time taken to pre-emptively apply the configuration changes to the first virtualized computing system.

6. The CIM of claim 5 further comprising:
   responsive to determining the first amount of time taken to pre-emptively apply the configuration changes to the first virtualized computing system, using the first amount of time taken to pre-emptively apply the configuration changes as a baseline update data for a future application of the configuration changes to the first virtualized computing system.

7. The CIM of claim 1, wherein the stack compatibility check comprises ensuring that the stack configuration of the virtualized environment remains compatible after the update.

8. A computer program product (CPP) for updating a virtualized computing environment, the CPP comprising:
   a machine readable storage device; and
   program instructions stored on the machine readable storage device, the program instructions executable by one or more processors, causing the processor to perform one or more operations, wherein the program instructions comprise:
   program instructions to identify a first plurality of updates that a first virtualized computing system requires, wherein the first virtualized computing system is a virtual IO server;
   program instructions to compare the first virtualized computing system with a set of benchmark virtualized computing systems to determine a set of similar virtualized computing systems that have made updates comparable to the first plurality of updates needed by the first virtualized computing system;
   program instructions to determine whether the update passes a stack compatibility check, based on comparing the first virtualized computing system with a set of benchmark virtualized computing systems;
   responsive to determining the update passes a stack compatibility check, program instructions to determine an estimated time to complete the first plurality of updates based, at least in part, upon a set of performance characteristics of the first virtualized computing system;
   program instructions to identify a first plurality of errors that occurred during an update of the set of similar virtualized computing systems; and
   responsive to identifying the first plurality of errors, program instructions to pre-emptively apply configuration changes to the first virtualized computing system.

9. The CPP of claim 8 further comprising:
   responsive to the identification of the first plurality of errors that occurred during the update of the set of similar virtualized computing systems, program instructions to determine that the first plurality of errors has not exceeded a first error threshold.

10. The CPP of claim 8 wherein the set of performance characteristics of the first virtualized computing system comprises information indicative of a compute performance of the first virtualized computing system.

11. The CPP of claim 8 wherein the set of performance characteristics of the first virtualized computing system comprises information indicative of a storage read and/or write performance data of the first virtualized computing system.

12. The CPP of claim 8 further comprising:
    program instructions to determine a first amount of time taken to pre-emptively apply the configuration changes to the first virtualized computing system.

13. The CPP of claim 12 further comprising:
    responsive to determining the first amount of time taken to pre-emptively apply the configuration changes to the first virtualized computing system, using the first amount of time taken to pre-emptively apply the configuration changes as a baseline update data for a future application of the configuration changes to the first virtualized computing system.

14. The CPP of claim 8, wherein the stack compatibility check comprises ensuring that the stack configuration of the virtualized environment remains compatible after the update.

15. A computer system (CS) for updating a virtualized computing environment, the CS comprising:
    one or more processors;
    a machine readable storage device coupled to the one or more processors; and one or more program instructions stored on the machine readable storage device, wherein the one or more program instructions can be executed by the one or more processors causing the processor to perform one or more functions comprising;
identifying a first plurality of updates that a first virtualized computing system requires, wherein the first virtualized computing system is a virtual IO server;
comparing the first virtualized computing system with a set of benchmark virtualized computing systems to determine a set of similar virtualized computing systems that have made updates comparable to the first plurality of updates required by the first virtualized computing system;
determining whether the update passes a stack compatibility check, based on comparing the first virtualized computing system with a set of benchmark virtualized computing systems;
responsive to determining the update passes a stack compatibility check, determining an estimated time to complete the first plurality of updates based, at least in part, upon a set of performance characteristics of the first virtualized computing system;
identifying a first plurality of errors that occurred during an update of the set of similar virtualized computing systems; and
responsive to identifying of the first plurality of errors, pre-emptively applying configuration changes to the first virtualized computing system.

16. The CS of claim 15 further causing the processor to perform one or more functions comprising:
responsive to identifying the first plurality of errors that occurred during the update of the set of similar virtualized computing systems, determining the first plurality of errors has not exceeded a first error threshold.

17. The CS of claim 15 wherein the set of performance characteristics of the first virtualized computing system comprises information indicative of a compute performance of the first virtualized computing system.

18. The CS of claim 15 wherein the set of performance characteristics of the first virtualized computing system comprises information indicative of a storage read and/or write performance data of the first virtualized computing system.

19. The CS of claim 15 further comprising:
determine a first amount of time taken to pre-emptively apply the configuration changes to the first virtualized computing system.

20. The CS of claim 19 further causing the processor to perform one or more functions comprising:
responsive to determining the first amount of time taken to pre-emptively apply the configuration changes to the first virtualized computing system, using the first amount of time taken to pre-emptively apply the configuration changes as a baseline update data for a future application of the configuration changes to the first virtualized computing system.

* * * * *